United States Patent
Maeoka (10) Patent No.: US 9,939,017 B2
(45) Date of Patent: Apr. 10, 2018

(54) BALL BEARING FOR STRAIN WAVE GEARING

(71) Applicant: JTEKT CORPORATION, Osaka-shi, Osaka (JP)

(72) Inventor: Yoshihisa Maeoka, Kitakaturagi-gun (JP)

(73) Assignee: JTEKT CORPORATION, Osaka (JP)

( * ) Notice: Subject to any disclaimer, the term of this patent is extended or adjusted under 35 U.S.C. 154(b) by 343 days.

(21) Appl. No.: 14/973,253

(22) Filed: Dec. 17, 2015

(65) Prior Publication Data

US 2016/0186809 A1    Jun. 30, 2016

(30) Foreign Application Priority Data

Dec. 24, 2014   (JP) .................................. 2014-260765

(51) Int. Cl.
| | |
|---|---|
| *F16C 33/38* | (2006.01) |
| *F16C 33/46* | (2006.01) |
| *F16C 33/41* | (2006.01) |
| *F16C 19/06* | (2006.01) |

(52) U.S. Cl.
CPC .......... *F16C 33/418* (2013.01); *F16C 33/416* (2013.01); *F16C 19/06* (2013.01)

(58) Field of Classification Search
CPC .......... F16H 49/001; F16C 33/38; F16C 33/46
USPC ........................................... 74/640; 384/572
See application file for complete search history.

(56) References Cited

U.S. PATENT DOCUMENTS

| | | | |
|---|---|---|---|
| 4,909,098 A | 3/1990 | Kiryu | |
| 6,890,105 B2 * | 5/2005 | Ide .................... | F16C 33/416 |
| | | | 384/470 |
| 9,829,042 B2 * | 11/2017 | Batalha ............... | F16C 33/6681 |
| 2015/0300475 A1 * | 10/2015 | Murayama ........... | F16H 49/001 |
| | | | 74/640 |
| 2016/0160921 A1 * | 6/2016 | Cisco .................. | F16C 33/6614 |
| | | | 384/531 |

FOREIGN PATENT DOCUMENTS

| | | |
|---|---|---|
| JP | S47-36545 A | 9/1972 |
| JP | S60-69851 U | 5/1985 |
| JP | S60-143244 A | 7/1985 |
| JP | S62-258242 A | 11/1987 |
| JP | 2011-158072 A | 8/2011 |

* cited by examiner

Primary Examiner — Ha Dinh Ho
(74) *Attorney, Agent, or Firm* — Oliff PLC (57) ABSTRACT

A bearing ring for a strain wave gearing includes an inner ring that is rotatable together with an elliptic cam and elastically deformable, an outer ring that is rotatable together with a flex spline and elastically deformable, a plurality of balls provided between the inner ring and the outer ring, and a cage with a plurality of pockets which is arranged in a circumferential direction and in which the balls are housed. The cage has a ring portion and a plurality of cage bars extending from the ring portion in the axial direction. The pockets are each located between the cage bars adjacent to each other in the circumferential direction. A circumferential clearance between the ball and the cage bar is equal to or larger than a radial clearance of an outer annular space between the outer ring deformed into a non-circular shape and the cage.

10 Claims, 10 Drawing Sheets

BALL BEARING FOR STRAIN WAVE GEARING

INCORPORATION BY REFERENCE

The disclosure of Japanese Patent Application No. 2014-260765 filed on Dec. 24, 2014 including the specification, drawings and abstract, is incorporated herein by reference in its entirety.

BACKGROUND OF THE INVENTION

1. Field of the Invention

The present invention relates to a ball bearing for a strain wave gearing.

2. Description of Related Art

Figure 9:
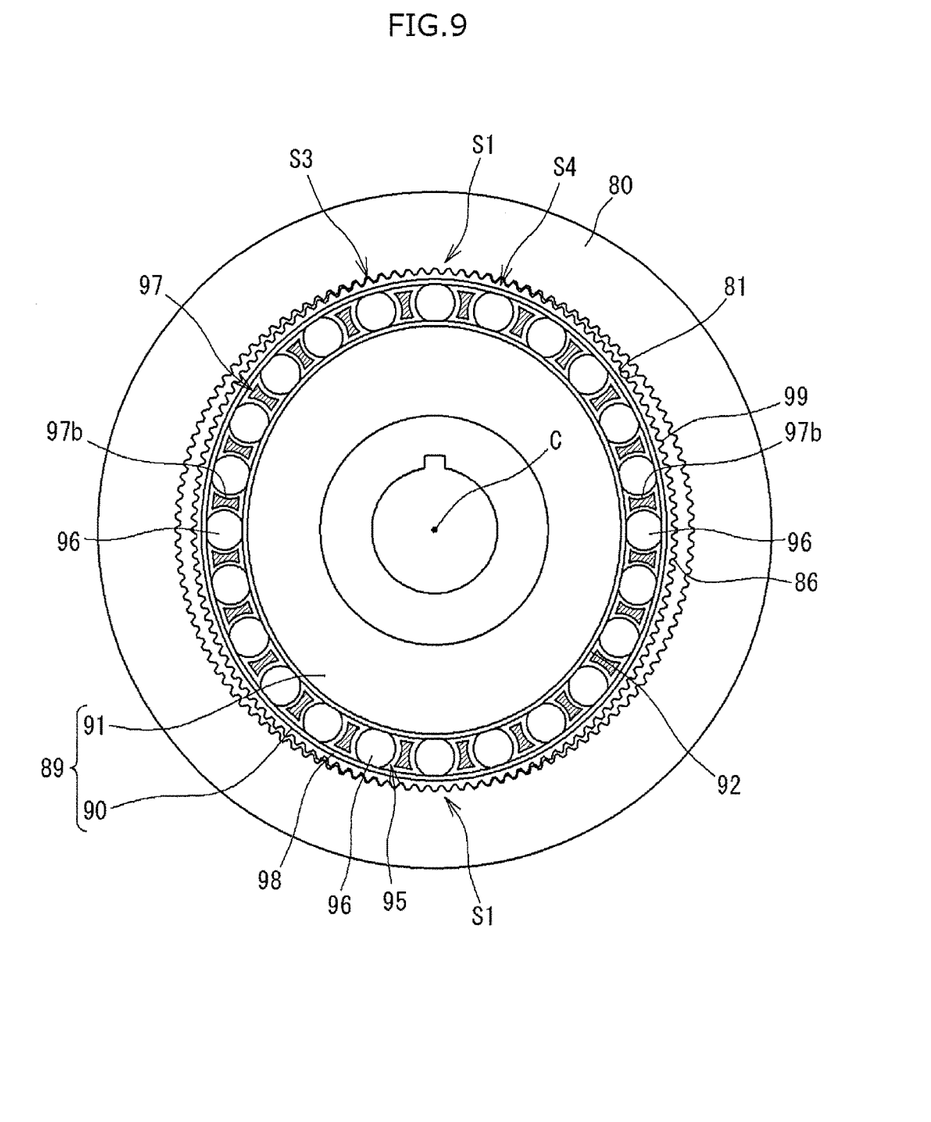
FIG. 9 is a diagram illustrating a conventional strain wave gearing.

A strain wave gearing is conventionally known which includes an annular circular spline 80, an annular flex spline 99, and a rotary member 89 as depicted in FIG. 9 (see Japanese Patent Application Publication No. S60-143244 (JP S60-143244 A)). The circular spline 80 has internal teeth 81. The flex spline 99 is provided inside the circular spline 80 and has external teeth 86 that mesh with the internal teeth 81. The rotary member 89 is provided inside the flex spline 99. In the strain wave gearing, the number of the external teeth 86 is set smaller than the number of the internal teeth 81. The rotary member 89 has a cam 91 and a ball bearing 90. The ball bearing 90 is externally fitted over the cam 91, with the flex spline 99 externally fitted over the ball bearing 90. The cam 91 has an elliptic shape. Thus, the ball bearing 90 and the flex spline 99 lying outside the cam 91 are deflected to have an elliptic shape, allowing the external teeth 86 of the flex spline 99 to partially mesh with the internal teeth 81 of the circular spline 80. In other words, the flex spline 99 deflected to have an elliptic shape meshes with the circular spline 80 at the portion of a major axis of the flex spline 99 deflected to have an elliptic shape and separates from the circular spline 80 at the portion of a minor axis of the flex spline 99.

The cam 91 is rotated to allow major axis positions (the positions where the flex spline 99 meshes with the internal teeth 81) of the elliptic flex spline 99 to be moved with respect to the circular spline 80. In conjunction with this movement, the flex spline 99 can be rotated with the teeth of the flex spline 99 partially meshing with the circular spline 80.

The ball bearing 90 provided outside the cam 91 having an elliptic shape has an outer ring 98, an inner ring 92, a plurality of balls 96, and an annular cage 97. The flex spline 99 is externally fitted over the outer ring 98. The inner ring 92 is externally fitted over the cam 91. The balls 96 are arranged in an annular space 95 formed between the outer ring 98 and the inner ring 92. The cage 97 holds the balls 96.

Figure 10A:
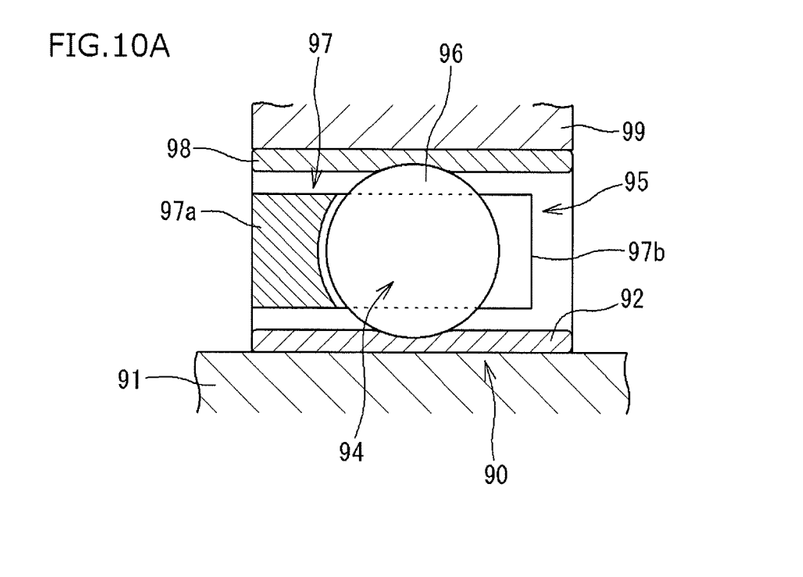
FIG. 10A is a transverse sectional view depicting a ball bearing and a periphery thereof.

FIG. 10A is a transverse sectional view depicting the ball bearing 90 and a peripheral portion thereof. The cage 97 has a ring portion 97a and a plurality of cage bars 97b. The cage bars 97b extend from the ring portion 97a in an axial direction. The cage 97 is known as what is called a snap cage. In the cage 97, pockets 94 that hold the respective balls 96 are each located between the adjacent cage bars 97b in a circumferential direction.

The outer ring 98, the inner ring 92, and the cage 97 in the ball bearing 90 each have a perfect round shape before the ball bearing 90 is attached to the cam 91. When the ball bearing 90 is attached to the cam 91, the outer ring 98 and the inner ring 92 are elastically deformed into an elliptic shape. In contrast, the cage 97 acts to maintain the perfect round shape. In such a strain wave gearing, possible backlash of the ball bearing 90 needs to be suppressed in order to prevent the elliptic shape of the flex spline 99 from being impaired. For this purpose, the ball bearing 90 for a strain wave gearing has more balls than standard ball bearings.

Figure 10B:
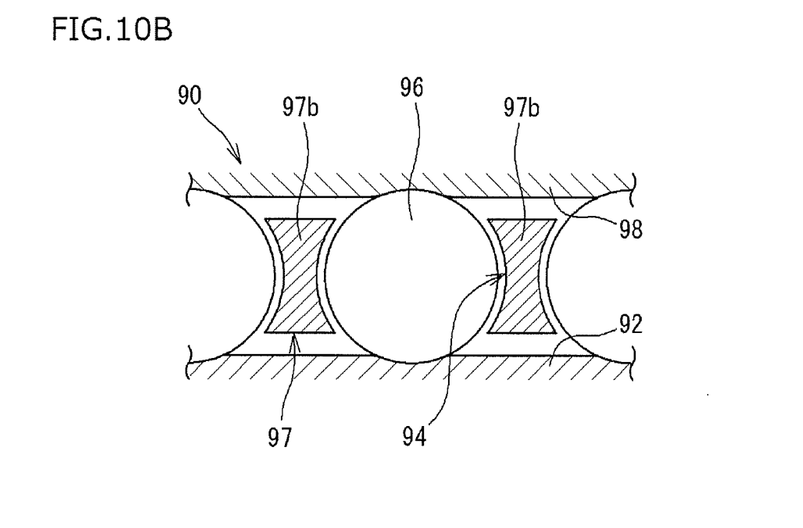
FIG. 10B is a diagram partially showing balls and a cage as viewed in a direction parallel to an axis of the ball bearing.

FIG. 10B is a diagram depicting the ball 96 and a part of the cage 97 as viewed in a direction parallel to an axis of the ball bearing 90. In the cage 97 of the conventional ball bearing 90 for a strain wave gearing, the pocket 94 is shaped along a spherical surface. The spherical surface is set to be slightly larger in radius than the ball 96. Thus, a clearance formed between the ball 96 and the pocket 94 is very small. This configuration allows the cage 97 to be positioned in a radial direction and the axial direction when the balls 96 and the pockets 94 come into contact with one another.

In the ball bearing 90 which is used for the strain wave gearing depicted in FIG. 9 and which is externally fitted over the elliptic cam 91, the balls 96 are placed in an elliptic arrangement in conjunction with the deformation of the inner ring 92 into an elliptic shape. Therefore, in the conventional ball bearing 90, the balls 96 are placed in an elliptic arrangement with respect to the cage 97 that acts to maintain a perfect round shape. In particular, at portions S1 (see FIG. 9) corresponding to the major axis of the ellipse, the clearance between the ball 96 and the pocket 94 (see FIG. 10B) is partially lost. Thus, the cage 97 may be deformed to cause a local stress. Furthermore, the cam 91 rotates to repeatedly cause such a stress. Moreover, the revolution speed of the ball 96 varies between two positions S3 and S4 across the portion S1 of the major axis (see FIG. 9). Consequently, possible advancement and delay of the balls 96 may cause each of the balls 96 to collide against the cage bar 97b (pocket 94), leading to an excessive stress on the cage 97.

Thus, the clearance formed between the ball 96 and the pocket 94 (see FIG. 10B) may be set to be larger in order to reduce the stress generated on the cage 97 due to the relationship between the balls 96 in the elliptic arrangement and the cage 97 (pockets 94). However, in this case, the cage 97 is unstably positioned in the radial direction and the axial direction. Thus, in particular, while the major axis direction of the ball bearing 90 deformed into an elliptic shape coincides with a vertical direction (see FIG. 9), the balls 96 at positions in a minor axis direction may push the cage bars 97b of the cage 97, and the cage 97 may wobble in conjunction with rotation. As a result, the cage 97 may be damaged in a short period of time, or vibration or noise may occur.

SUMMARY OF THE INVENTION

An object of the present invention is to provide a ball bearing for a strain wave gearing that enables a reduction in stress generated on a cage, while allowing stable rotation of the cage.

A ball bearing of the present invention for a strain wave gearing includes a circular spline with internal teeth, a flex spline provided inside the circular spline and having external teeth that mesh with the internal teeth, and a rotary member that is provided inside the flex spline and deforms the flex spline into a non-circular shape to cause the external teeth to partially mesh with the internal teeth. The ball bearing has an inner bearing ring that is rotatable together with a non-circular cam provided in the rotary member and that is elastically deformable, an outer bearing ring that is rotatable together with the flex spline and that is elastically deformable, a plurality of balls provided between the inner bearing ring and the outer bearing ring, and a cage with a plurality of pockets, which is arranged in a circumferential direction and in which the balls are housed. The cage has a ring portion and a plurality of cage bars extending from the ring portion in an axial direction. The pockets are each located between the cage bars adjacent to each other in the circumferential direction. An inner side surface of the pocket, which is contactable with the ball, is formed of a face that is straight in a radial direction. A circumferential clearance formed between the ball and the cage bar is equal to or larger than a radial clearance of an annular space formed between the bearing ring deformed into a non-circular shape and the cage.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
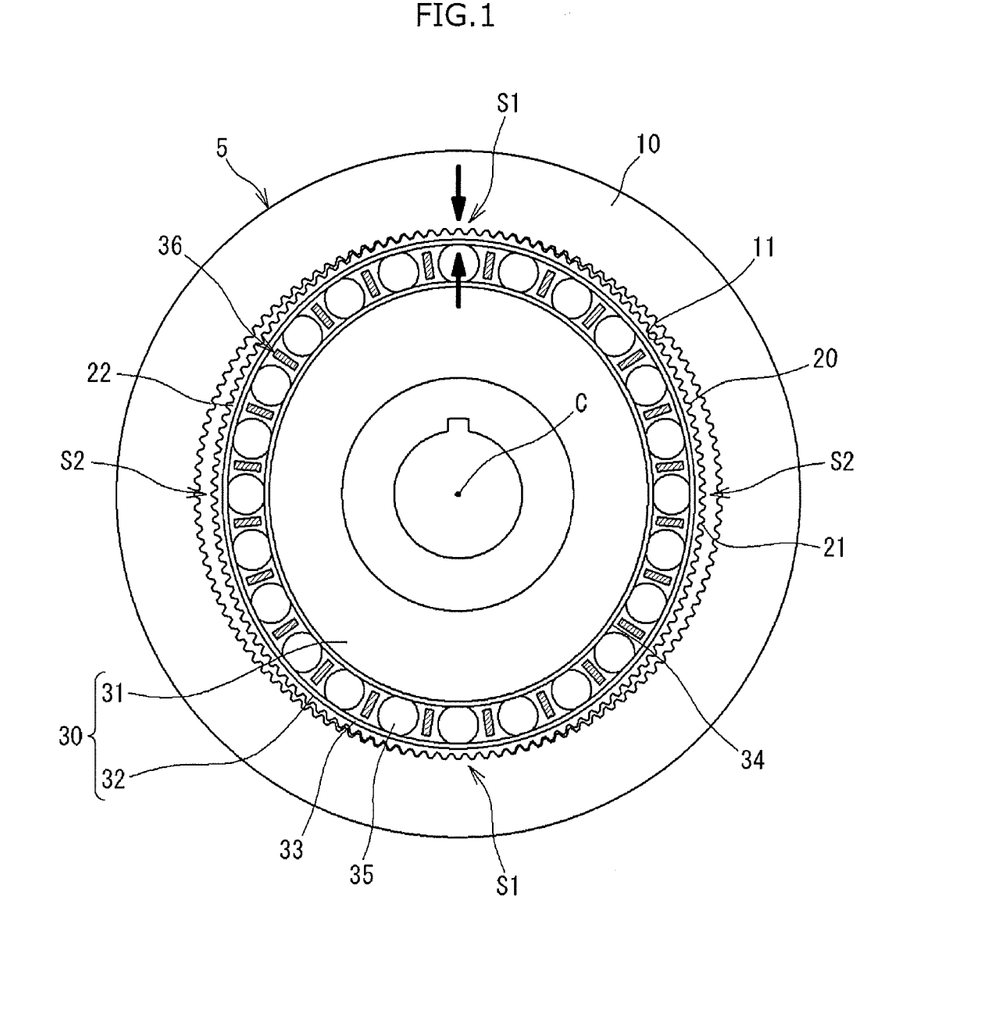
FIG. 1 is a schematic diagram of an embodiment of a strain wave gearing including a ball bearing according to the present invention as viewed in an axial direction.
Figure 2:
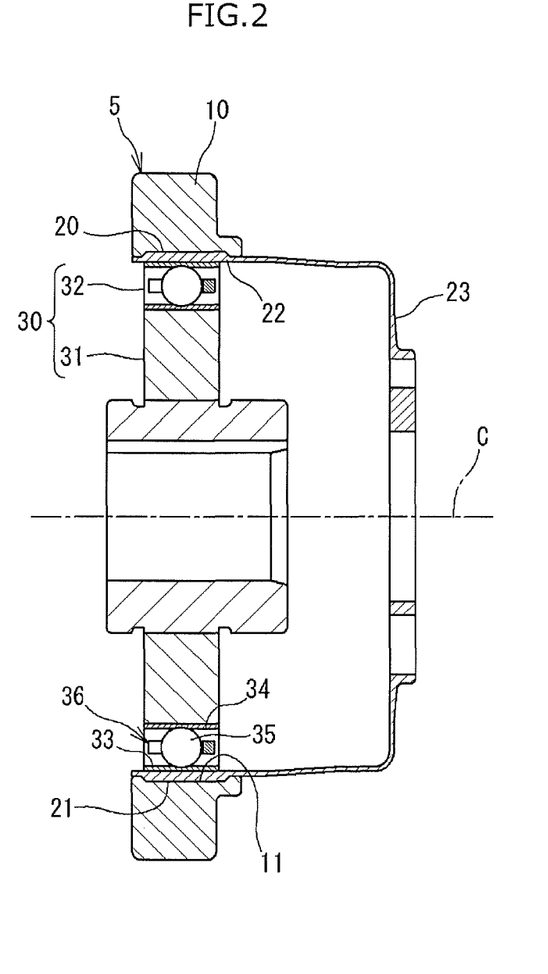
FIG. 2 is a vertical sectional view of the strain wave gearing depicted in FIG. 1.

An embodiment of the present invention will be described based on the drawings. FIG. 1 is a schematic diagram of an embodiment of a strain wave gearing 5 including a ball bearing 32 in the present invention as viewed in an axial direction. FIG. 2 is a vertical sectional view of the strain wave gearing 5. The strain wave gearing 5 includes a circular spline 10, a flex spline 20, and a rotary member 30.

The circular spline 10 is an annular rigid member (metal member) and has internal teeth 11 on an inner peripheral surface thereof. The inner peripheral surface is a circular (perfect round) surface centered at an axis C. The circular spline 10 is fixed to a casing (not depicted in the drawings) of the strain wave gearing 5.

The flex spline 20 is provided inside the circular spline 10 in a radial direction. The flex spline 20 has, on an outer peripheral surface thereof, external teeth 21 that partially mesh the internal teeth 11. The flex spline 20 in the present embodiment (see FIG. 2) is a metal elastic body shaped like a thin cup and has a cylindrical portion 22 and a bottom portion 23. The external teeth 21 are provided on an outer peripheral surface of the cylindrical portion 22. An output shaft not depicted in the drawings is attached to the bottom portion 23. The number of the external teeth 21 on the flex spline 20 is smaller than the number of the internal teeth 11 on the circular spline 10. In the present embodiment, the number of the external teeth 21 is smaller than the number of the internal teeth 11 by two. The difference in the number of the teeth is optional.

As described below, the cylindrical portion 22 of the flex spline 20 can be deflected to have a non-circular shape (an ellipse in the present embodiment) by being elastically deformed as depicted in FIG. 1. The external teeth 21 and the internal teeth 11 mesh with one another at portions S1 corresponding to a major axis of the ellipse and separate from one another at portions S2 corresponding to a minor axis of the ellipse.

The rotary member 30 is provided inside the cylindrical portion 22 of the flex spline 20 in the radial direction. The rotary member 30 has a cam 31 and a ball bearing 32. The cam 31 is non-circular and is elliptic in the present embodiment (see FIG. 1). The ball bearing 32 is externally fitted over the cam 31, and the cylindrical portion 22 of the flex spline 20 is externally fitted over the ball bearing 32.

Figure 3:
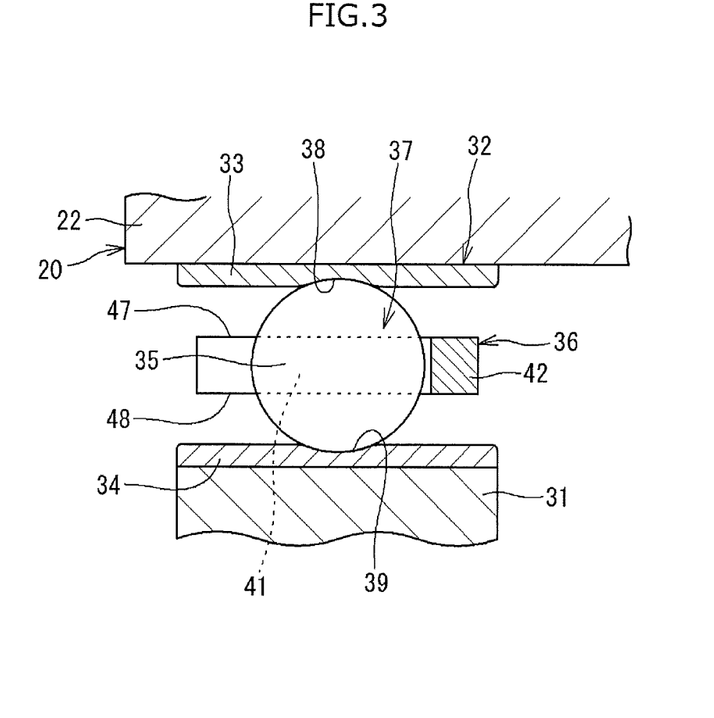
FIG. 3 is a vertical sectional view of the ball bearing.

As depicted in FIG. 3, the ball bearing 32 has a thin outer bearing ring (hereinafter referred to as an outer ring 33), a thin inner bearing ring (hereinafter referred to as an inner ring 34), a plurality of balls 35, and an annular cage 36. The balls 35 are provided between the outer ring 33 and the inner ring 34. In the cage 36, a plurality of pockets 37 in which the balls 35 are housed is formed at intervals in a circumferential direction. All the pockets 37 have the same shape.

The outer ring 33 and the inner ring 34 are annular members made of metal, for example, bearing steel, but can be elastically deformed (are easily elastically deformed) in the radial direction because the outer ring 33 and the inner ring 34 are thin. The thickness (maximum thickness) of the outer ring 33 and the inner ring 34 is, for example, one-seventh or more and half or less of the diameter of the balls 35. The balls 35 are also made of metal, for example, bearing steel. The outer ring 33 has a raceway groove 38 formed in an inner peripheral surface thereof and having a circular-arc-shaped section. The inner ring 34 has a raceway groove 39 formed in an outer peripheral surface thereof and having a circular-arc-shaped section. The balls 35 can roll along the raceway grooves 38 and 39.

The inner ring 34 is fixed to the cam 31 (externally fitted over the cam 31) such that the inner ring 34 and the cam 31 can rotate together. The outer ring 33 is fixed to the cylindrical portion 22 of the flex spline 20 (the cylindrical portion 22 is externally fitted over the outer ring 33) such that the outer ring 33 and the flex spline 20 can rotate together. The cam 31 is shaped like an ellipse along an outer periphery thereof (see FIG. 1), and thus, the inner ring 34 is elastically deformed into an ellipse conforming to the shape of the cam 31. The outer ring 33 and the cylindrical portion 22 are also elastically deformed into ellipses via the balls 35.

The rotary member 30 having the cam 31 and the ball bearing 32 as depicted in FIG. 1 and FIG. 2 is also referred to as a strain wave generator. An input shaft not depicted in the drawings is attached to the cam 31. Thus, the rotary member 30 deflects the flex spline 20 so that the flex spline 20 has an elliptic shape to allow the external teeth 21 of the flex spline 20 to partially mesh with the internal teeth 11 of the circular spline 10. In the present embodiment, the external teeth 21 and the internal teeth 11 mesh with one another at two points separated by 180 degrees.

As depicted in FIG. 1, the flex spline 20 is deflected to have an elliptic shape by the rotary member 30. The external teeth 21 and the internal teeth 11 mesh with one another at the portions S1 of the major axis of the ellipse and separate from one another at the portions S2 of a minor axis of the ellipse. The circular spline 10 is fixed. In this state, when the cam 31 is rotated clockwise around an axis C in FIG. 1 (see FIG. 4A), the positions of the portions S1 of the major axis of the flex spline 20 move (change), thus moving (changing) the meshed portions between the external teeth 21 and the internal teeth 11.

Figure 4A:
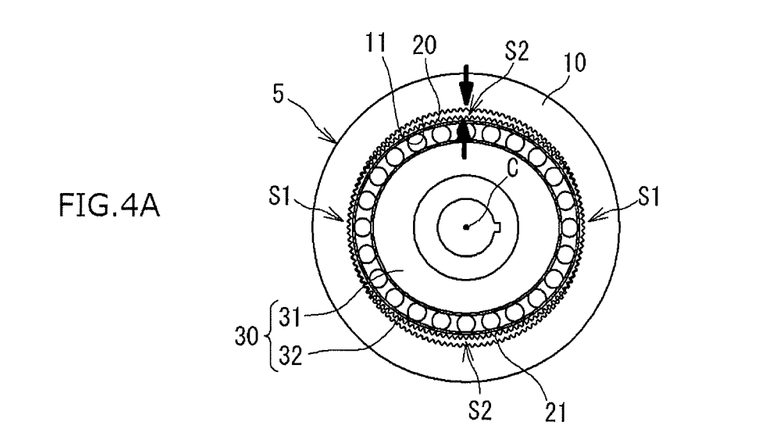
FIGS. 4A, 4B, and 4C are diagrams illustrating operations of the strain wave gearing.
Figure 4B:
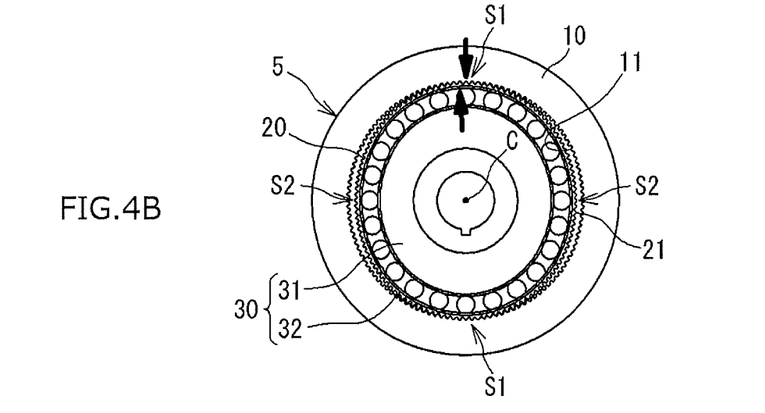
Figure 4C:
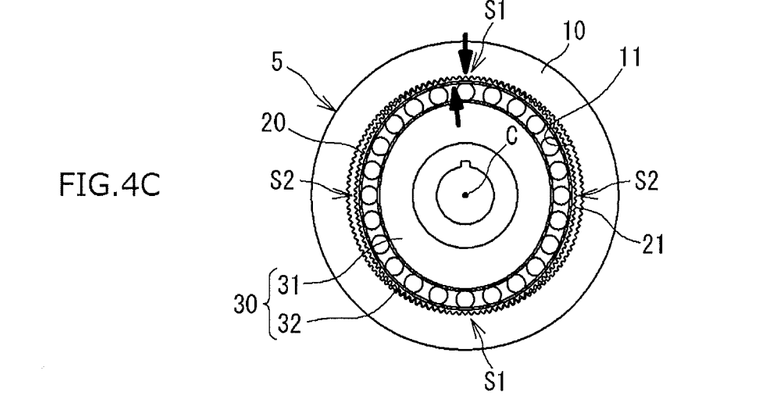

As depicted in FIG. 4B, when the cam 31 in the state in FIG. 1 is rotated by 180 degrees, the flex spline 20 moves in a direction (counterclockwise direction) opposite to a rotating direction of the cam 31 by a distance corresponding to one teeth that is equal to half the difference in the number of teeth between the external teeth 21 and the internal teeth 11. Then, when the cam 31 in the state in FIG. 4B is further rotated by 180 degrees as depicted in FIG. 4C, the flex spline 20 moves in the direction (counterclockwise direction) opposite to the rotating direction of the cam 31 by a distance corresponding to two teeth equal to the difference in the number of teeth between the external teeth 21 and the internal teeth 11. The cam 31 can rotate together with the input shaft not depicted in the drawings. The flex spline 20 can rotate together with an output shaft not depicted in the drawings. Thus, the strain wave gearing 5 outputs rotation of the flex spline 20 in response to an input to the cam 31. In FIGS. 4A, 4B, and 4C, the cage 36 of the ball bearing 32 is omitted.

Figure 5:
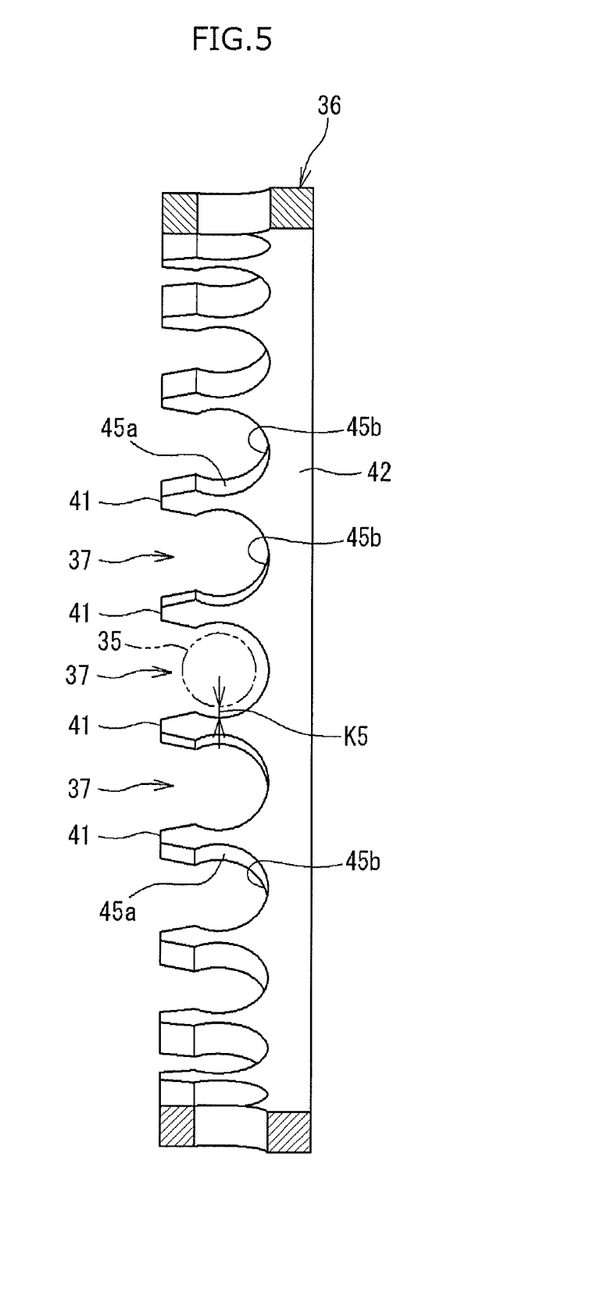
FIG. 5 is a diagram illustrating a half of a cage of the ball bearing.

FIG. 5 is a diagram depicting the half of the cage 36 of the ball bearing 32. The cage 36 is a snap cage. The cage 36 has an annular ring portion 42 and a plurality of cage bars 41 extending from the ring portion 42 in the axial direction. Pockets 37 are each located between the adjacent cage bars 41 in the circumferential direction. One ball 35 is housed in each of the pockets 37. Before the ball bearing 32 is attached to the cam 31, the cage 36 has a circular (perfect round) shape similarly to the outer ring 33 and the inner ring 34. The cage 36 in the present invention is made of resin.

Figure 6A:
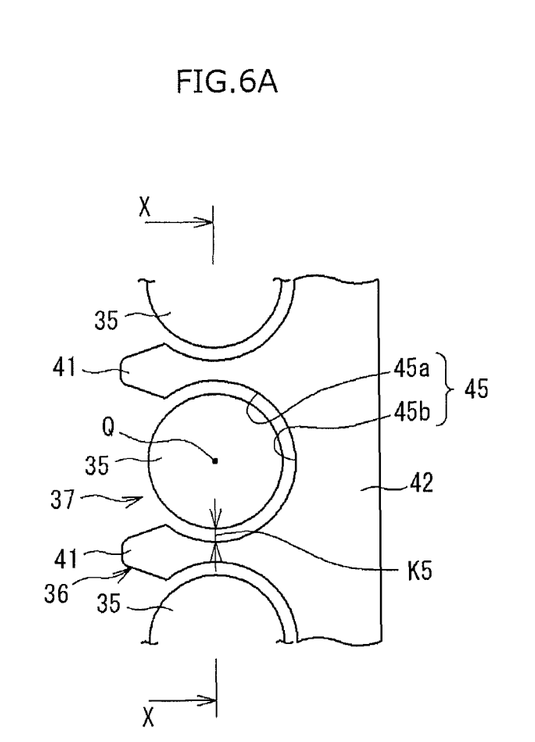
FIGS. 6A and 6B are diagrams illustrating a pocket in the cage and a ball held in the pocket, FIG. 6A depicting the pocket and the ball as viewed in a radial direction, FIG. 6B taken along line X-X indicated by arrows in FIG. 6A.
Figure 6B:
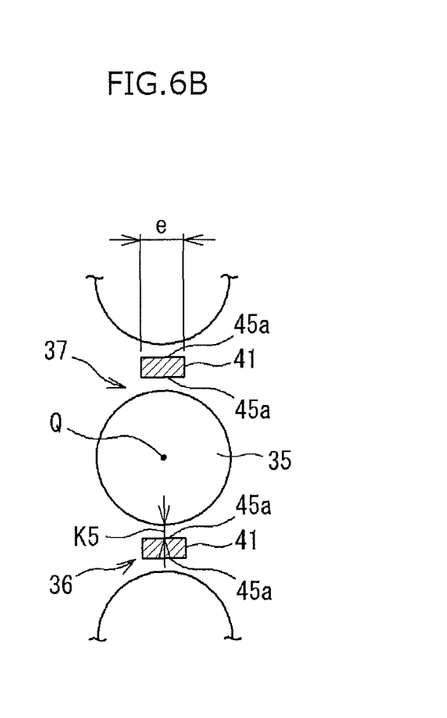

FIGS. 6A and 6B are diagrams illustrating the pocket 37 in the cage 36 and the ball 35 held in the pocket 37. FIG. 6A is as viewed in the radial direction, and FIG. 6B is taken along line X-X indicated by arrows in FIG. 6A. In FIGS. 5, 6A, and 6B, an inner side surface 45a of the cage bar 41, which faces the ball 35, and an inner side surface 45b of the ring portion 42, which faces the ball 35, can come into contact with the ball 35. The inner side surfaces 45a and 45b form an inner side surface (pocket surface) 45 of the pocket 37 that is contactable with the ball 35. The inner side surface 45 is formed of a face that is straight in the radial direction (the direction orthogonal to the sheet of FIG. 6A). Specifically, the pocket 37 (inner side surface 45) is shaped along a cylindrical surface with its center line direction corresponding to the radial direction.

An appropriate clearance is formed between the inner side surface 45 and the ball 35. Before the ball bearing 32 is attached to the cam 31, there is a clearance formed between the ball 35 and the cage bars 41 in the circumferential direction (hereinafter referred to as the circumferential clearance) as depicted in FIGS. 6A and 6B, which is denoted by "K5" in FIGS. 6A and 6B. The circumferential clearance K5 is defined by a clearance formed while a pocket center coincides with a ball center, and represents a dimension of the clearance in the circumferential direction. The pocket center and the ball center that coincides with each other is represented by a point Q in FIG. 6A. The pocket center is the center of the pocket 37 and is an intersection point between a center line of the cylindrical surface and a pitch circle of the ball 35. The ball center is the center of the ball 35. As depicted in FIG. 3, an outer peripheral surface 47 (radially outer surface) of the cage 36 has a shape conforming to a cylindrical surface with a center line corresponding to the axis of the cage 36. An inner peripheral surface 48 (radially inner surface) of the cage 36 has a shape conforming to the cylindrical surface with the center line corresponding to the axis of the cage 36.

Figure 7:
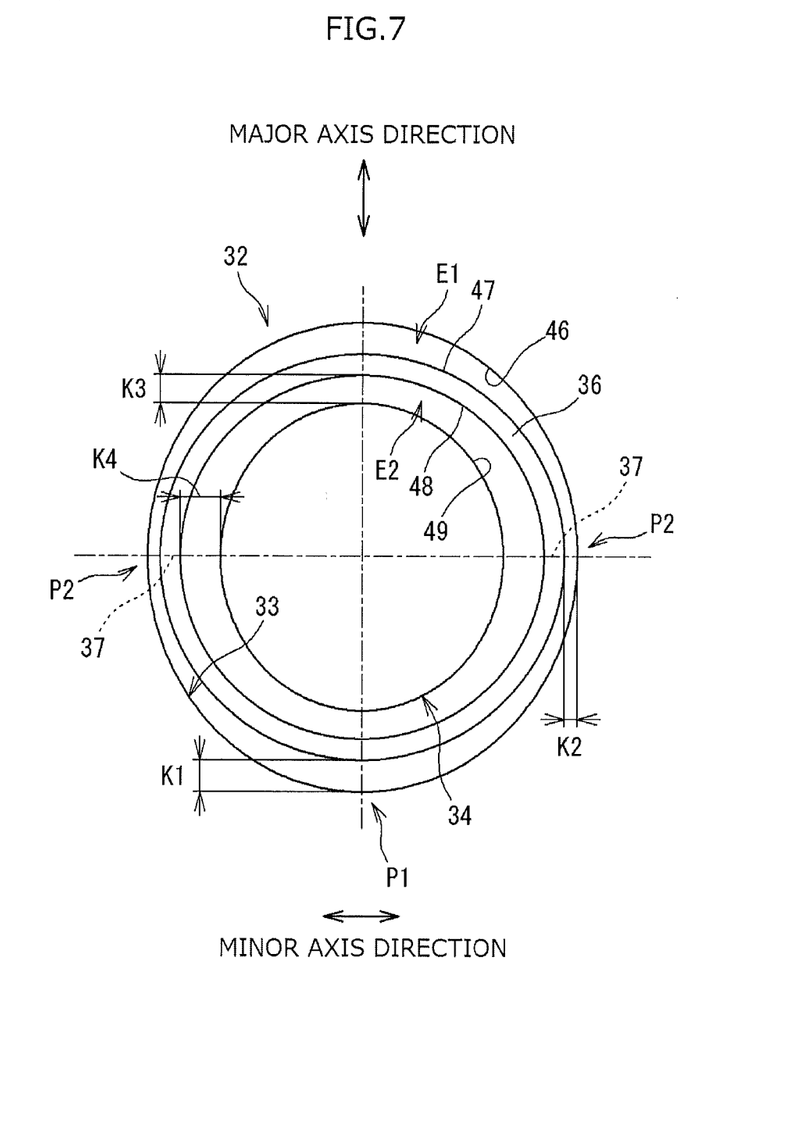
FIG. 7 is a diagram illustrating the ball bearing deformed into an ellipse as viewed in an axial direction.

FIG. 7 is a diagram of the ball bearing 32 deformed into an elliptic shape as viewed in the axial direction. FIG. 7 depicts contour shapes of an inner peripheral surface 46 of the outer ring 33, the outer peripheral surface 47 and the inner peripheral surface 48 of the cage 36, and an outer peripheral surface 49 of the inner ring 34. Since the cam 31 over which the ball bearing 32 is externally fitted (see FIG. 1) is elliptic as described above, the inner ring 34 of the ball bearing 32 is also elastically deformed into an elliptic shape, with the balls 35 arranged along the elliptic inner ring 34. Moreover, the outer ring 33 is also elastically deformed into an elliptic shape. In contrast, in the cage 36, a clearance with an appropriate size (the above-described circumferential clearance K5) is set between the inner side surface 45 of the pocket 37 and the ball 35, as depicted in FIGS. 6A and 6B. Thus, the cage 36 maintains its original perfect round shape without following the balls 35 placed in an elliptic arrangement. Consequently, in each of the pockets 37 on both sides in the major axis direction in FIG. 7, the circumferential clearance K5 is present between the ball 35 (see FIGS. 6A and 6B) and the cage bars 41 lying on both sides of the ball 35. In FIG. 7, an up-down direction represents a major axis direction, and a lateral direction represents a minor axis direction. When the cam 31 rotates with the strain wave gearing 5 in operation (in rotation), the major axis direction and the minor axis direction accordingly change.

An outer annular space E1 is formed between the outer peripheral surface 47 of the cage 36 and the inner peripheral surface 46 of the outer ring 33. An inner annular space E2 is formed between the inner peripheral surface 48 of the cage 36 and the outer peripheral surface 49 of the inner ring 34.

In the outer annular space E1, the radial clearance K1 at major axis positions is different from a radial clearance K2 at minor axis positions. K1 is larger than K2 (K1>K2). The radial clearance K1 at the major axis positions is the largest in the outer annular space E1. The radial clearance K2 at the minor axis positions is the smallest in the outer annular space E1. In the inner annular space E2, a radial clearance K3 at the major axis positions is different from a radial clearance K4 at the minor axis positions. K3 is smaller than K4 (K3<K4). The radial clearance K3 at the major axis positions is the smallest in the inner annular space E2. The radial clearance K4 at the minor axis positions is the largest in the inner annular space E2.

The radial clearances K1, K2, K3, and K4 are each defined by the dimension, in the radial direction, of the outer or inner annular space E1 or E2 formed between the outer ring 33 or the inner ring 34 deformed into an elliptic shape and the perfect round cage 36 when the ball bearing 32 is stopped (is not in rotation) and the centers of the outer ring 33 and the inner ring 34 coincide with the center of the cage 36. In the description below, the outer ring 33 and the inner ring 34 are concentrically arranged, and the centers of the outer ring 33 and the inner ring 34 are referred to as a bearing ring center. Since the outer ring 33 and the inner ring 34 are each deformed into elliptic shape, the bearing ring center corresponds to an intersection point between the major axis and the minor axis (the center of the ellipse). The center of the cage 36 is referred to as a cage center.

The circumferential clearance K5 (see FIGS. 6A and 6B) formed between the ball 35 in the pocket 37 at each minor axis position in FIG. 7 and each of the cage bars 41 lying on both sides of the ball 35 is set equal to or larger than the radial clearance K1 (K5≥K1) of the outer annular space E1 at each major axis position formed between the outer ring 33 formed into an elliptic shape and the perfect round cage 36 while the bearing ring center coincides with the cage center (see FIG. 7). In the present embodiment, at the major axis position, the radial clearance K3 between the cage 36 and the inner ring 34 is equal to or larger than the radial clearance K1 between the cage 36 and the outer ring 33 (K3≥K1) as depicted in FIG. 7.

The circumferential clearance K5 thus set (see FIGS. 6A and 6B) is larger than a conventional circumferential clearance K5. Thus, even when the balls 35 are placed in an elliptic arrangement, the appropriate distance between the ball 35 and the cage bar 41 (the inner side surface 45 of the pocket 37) is maintained Consequently, the cage 36 is less likely to be restrained by the balls 35 and maintains its original perfect round shape, allowing prevention of a possible local stress on the cage 36. This enables a reduction in the stress generated on the cage 36. In particular, when the balls 35 are placed in an elliptic arrangement, the distance between the ball 35 and each of the cage bars 41 (the inner side surface 45a of the pocket 37) is reduced at the major axis positions of the ellipse. However, even with the reduced distance, the appropriate distance between the ball 35 and each of the cage bars 41 (the inner side surface 45a of the pocket 37) is maintained as described above. As a result, a possible local stress on the cage 36 can be prevented.

While the up-down direction corresponds to the vertical direction and the major axis direction of the inner ring 34 and the outer ring 33 each deformed into an elliptic shape corresponds to the vertical direction (the direction of gravity) in FIG. 7, the cage 36 moves (falls) in the vertical direction (downward in FIG. 7) by gravity. At this time, the distance by which the cage 36 falls is equal to the radial clearance K1. Thus, the present embodiment sets the dimensional relationship K5≥K1 as described above. Consequently, when the cage 36 falls downward in the vertical direction with the ball bearing 32 in rotation and the major axis direction coinciding with the vertical direction, the cage 36 can come into abutting contact with the inner peripheral surface 46 of the outer ring 33 at the major axis position P1 (at a lower end of FIG. 7) prior to the cage bar 41 (the inner side surface 45a of the pocket 37) coming into abutting contact with the ball 35 at the minor axis position P2. Accordingly, the cage 36 is guided by the outer ring 33 rather than by the balls 35 and can rotate stably. Even if K5=K1 while the ball bearing 32 is not in rotation, the ball bearing 32 rotates to centrifugalize the cage 36, thus slightly increasing the diameter of the cage 36. Hence, while the ball bearing 32 is in rotation, K5>K1 is ensured and the cage 36 is guided by the outer ring 33 rather than by the balls 35 at the major axis position P1 (at the lower end of FIG. 7).

At the major axis positions, K3≥K1 as described above. Thus, the cage 36 can be reliably guided by the outer ring 33 rather than by the inner ring 34. Even if K3=K1 while the ball bearing 32 is not in rotation, the ball bearing 32 rotates to centrifugalize the cage 36, thus slightly increasing the diameter of the cage 36. Hence, while the ball bearing 32 is in rotation, K3>K1 is ensured and the cage 36 is guided by the outer ring 33 rather than by the inner ring 34.

Figure 8:
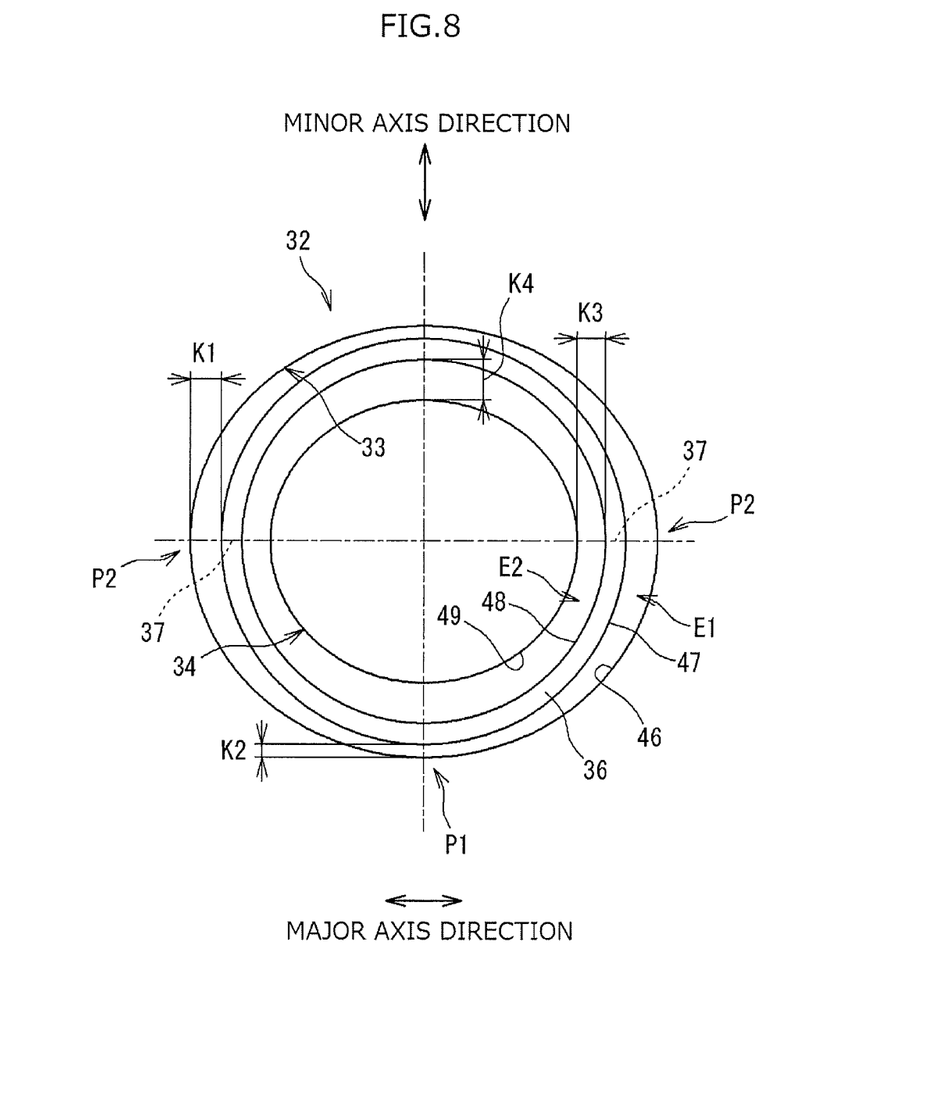
FIG. 8 is a diagram illustrating the ball bearing deformed into an ellipse as viewed in the axial direction.

When the cam 31 in the state depicted in FIG. 7 rotates by 90 degrees, the minor axis direction coincides with the vertical direction, while the major axis direction coincides with the horizontal direction (see FIG. 8). Even in this state, the cage 36 moves (falls) downward in the vertical direction (downward in FIG. 8). At this time, the distance by which the cage 36 falls corresponds to the radial clearance K2. Even in this case, the circumferential clearance K5 (see FIG. 6) formed at each major axis position between the ball 35 in the pocket 37 and each of the cage bars 41 lying on both sides of the ball 35 is larger than the radial clearance K2 of the outer annular space E1 formed between the outer ring 33 deformed into an elliptic shape and the perfect round cage 36 while the bearing ring center coincides with the cage center (K5>K2). In particular, in the present embodiment, the circumferential clearance K5 is equal to or larger than the radial clearance K1 of the outer annular space E1 at the major axis positions (K5≥K1) as described above. In the outer annular space E1, the radial clearance K2 at the minor axis positions is the smallest, while the radial clearance K1 at the major axis positions is the largest (K1>K2), and thus, a relationship K5≥K1>K2 is present.

As described above, the dimensional relationship K5>K2 is present. Thus, when the cage 36 falls downward in the vertical direction while the ball bearing 32 is in rotation with the minor axis direction coinciding with the vertical direction, the cage 36 can come into abutting contact with the inner peripheral surface 46 of the outer ring 33 at the minor axis position P1 (at a lower end of FIG. 8) prior to the cage bar 41 (the inner side surface 45a of the pocket 37) coming into abutting contact with the ball 35 at the major axis position P2. Accordingly, the cage 36 is guided by the outer ring 33 rather than by the balls 35 and can rotate stably. Since K4>K2 at the minor axis position, the cage 36 can be reliably guided by the outer ring 33 rather than by the inner ring 34. As a result, the ball bearing 32 in the present embodiment serves as an outer ring guiding bearing that allows the cage 36 to be guided by the outer ring 33.

In the above-described embodiment, setting K3≥K1 in FIG. 7 allows the cage 36 to be guided by the outer ring 33. However, K3<K1 may be used. However, even in this case, the circumferential clearance K5 (see FIGS. 6A and 6B) in the pocket 37 at each minor axis position in FIG. 7 is equal to or larger than the radial clearance K3 of the inner annular space E2 at each major axis position, which is formed between the inner ring 34 deformed into an elliptic shape and the perfect round cage 36 when the bearing ring center coincides with the cage center (K5≥K3).

This will be described with reference to FIG. 7. While the up-down direction corresponds to the vertical direction and the major axis direction of the inner ring 34 and the outer ring 33 each deformed into an elliptic shape corresponds to the vertical direction (the direction of gravity), the cage 36 moves (falls) downward in the vertical direction (downward in FIG. 7). At this time, the distance by which the cage 36 falls corresponds to the radial clearance K3. As described above, the dimensional relationship K5≥K3 is present. Thus, when the cage 36 falls downward in the vertical direction with the ball bearing 32 in rotation and the major axis direction coinciding with the vertical direction, the cage 36 can come into abutting contact with the outer peripheral surface 49 of the inner ring 34 at the major axis position P1 (at the lower end of FIG. 7) prior to the cage bar 41 (the inner side surface 45a of the pocket 37) coming into abutting contact with the ball 35 at the minor axis position P2. Accordingly, the cage 36 is guided by the inner ring 34 rather than by the balls 35 and can rotate stably.

However, when the cam 31 rotates at a high speed and the ball bearing 32 also rotates at a high speed, the diameter of the cage 36 is increased by a centrifugal force as described above. Therefore, K3≥K1 is more preferable than K3<K1 in order to allow the cage 36 to be guided by the outer ring 33.

As described above, in the ball bearing 32 of the present embodiment, the circumferential clearance K5 formed between the ball 35 and the cage bar 41 with the pocket center coinciding with the ball center in the pocket 37 at the minor axis positions (see FIGS. 6A and 6B) is equal to or larger than the radial clearance K1 (K2) of the outer annular space E1 formed between the outer ring 33 deformed into an elliptic shape and the perfect round cage 36 with the bearing ring center coinciding with the cage center, as illustrated in FIGS. 6A, 6B and 7.

Moreover, the inner side surface (pocket surface) 45 of the pocket 37 in the cage 36, which is contactable with the ball 35, is formed of a face that is straight in the radial direction (see FIGS. 6A and 6B). Thus, even when the cam 31 having an elliptic shape causes the ball bearing 32 to be deformed into an elliptic shape to place the balls 35 in an elliptic arrangement, locally reducing the clearance between the ball 35 and each of the cage bars 41 (particularly at the major axis positions), the cage bars 41 are less likely to be restrained by the ball 35, allowing prevention of a possible significant stress on the cage 36. That is, in the strain wave gearing 5, the ball bearing 32 is deformed into an elliptic shape, placing the balls 35 in the elliptic arrangement. However, in the present embodiment, since the inner side surface 45 of the pocket 37 in the cage 36 is formed of a face that is straight in the radial direction and is thus less likely to be affected by the balls 35 placed in the elliptic arrangement. Consequently, the cage 36 can act to maintain the circular (perfect round) shape, preventing a possible significant stress.

In the cage 36 of the present embodiment, the cage bar 41 has a decreasing circumferential dimension. This makes the clearance between the pocket 37 and the ball 35 (circumferential clearance K5: see FIGS. 6A and 6B) larger to increase the degree of freedom of relative movement between the balls 35 and the cage 36. The cage bar 41 also has a decreasing radial dimension (thickness) e (see FIG. 6B). This increases the degree of freedom of movement of the cage 36 with respect to the outer ring 33 and the inner ring 34. Thus, this achieves a configuration that can release (reduce) a stress resulting from the restraint of the cage 36.

As described above, in the cage 36, the appropriate distance between the ball 35 and the cage bar 41 (the inner side surface 45 of the pocket 37) is maintained. As a result, the cage 36 is less likely to be restrained by the balls 35 and acts to maintain its original perfect round shape. This enables prevention of a possible local stress on the cage 36 resulting from, for example, advancement and delay of the balls 35. In other words, the stress generated on the cage 36 can be reduced. Furthermore, the cage 36 is formed of resin and specifically a resin containing no reinforcement such as reinforcing fibers (for example, 66 nylon). Thus, the cage 36 (particularly the cage bars 41) is easily deformed, and is less likely to be broken even in a collision with the balls 35.

Moreover, since the clearances are set as described above, the cage 36 can come into abutting contact with the inner peripheral surface 46 of the outer ring 33 at the major axis position P1 (at the lower end of FIG. 7) prior to the cage bar 41 (the inner side surface 45a of the pocket 37) coming into abutting contact with the ball 35 at the minor axis position P2. Accordingly, the cage 36 is guided by the outer ring 33 rather than by the balls 35 and can rotate stably. Consequently, the cage 36 can be prevented from colliding heavily against the balls 35 and thus from being broken. This enhances the durability of the cage 36, thus making the ball bearing 32 for the strain wave gearing more reliable. As a result, the reliable strain wave gearing 5 is obtained.

The strain wave gearing 5 and the ball bearing 32 in the present invention are not limited to the form illustrated in the drawings and may be in any other form within the scope of the present invention. In the above-described embodiment, the case has been described where the cam 31 is elliptic. However, the cam 31 may have any other, non-circular shape. In the above-described embodiment, the case has been described where the flex spline 20 is externally fitted directly over the outer periphery of the ball bearing 32 (outer ring 33). However, the flex spline 20 may be externally fitted over the ball bearing 32 via an elastic layer. An intermediate member may also be interposed between the cam 31 and the inner ring 34.

The ball bearing for a strain wave gearing in the present invention enables a reduction in a stress generated on a cage and also enables the cage to rotate stably.

What is claimed is:

1. A ball bearing for a strain wave gearing including a circular spline with internal teeth, a flex spline provided inside the circular spline and having external teeth that mesh with the internal teeth, and a rotary member that is provided inside the flex spline and deforms the flex spline into a non-circular shape to cause the external teeth to partially mesh with the internal teeth, the ball bearing comprising:
    an inner bearing ring that is rotatable together with a non-circular cam provided in the rotary member and that is elastically deformable;
    an outer bearing ring that is rotatable together with the flex spline and that is elastically deformable;
    a plurality of balls provided between the inner bearing ring and the outer bearing ring; and
    a cage with a plurality of pockets which is arranged in a circumferential direction and in which the balls are housed, wherein
    the cage has a ring portion and a plurality of cage bars extending from the ring portion in an axial direction; the pockets are each located between the cage bars adjacent to each other in the circumferential direction; an inner side surface of the pocket, which is contactable with the ball, is formed of a face that is straight in a radial direction; and a circumferential clearance formed between the ball and the cage bar is equal to or larger than a radial clearance of an annular space formed between the bearing ring deformed into a non-circular shape and the cage.

2. The ball bearing for a strain wave gearing according to claim 1, wherein the circumferential clearance is equal to or larger than a radial clearance of an outer annular space formed between the outer bearing ring and the cage.

3. The ball bearing for a strain wave gearing according to claim 1, wherein, while a major axis direction of the bearing ring deformed into a non-circular shape coincides with a vertical direction, the circumferential clearance in the pocket at a position in a minor axis direction is equal to or larger than a radial clearance of the annular space at a major axis position.

4. The ball bearing for a strain wave gearing according to claim 2, wherein, while a major axis direction of the bearing ring deformed into a non-circular shape coincides with a vertical direction, the circumferential clearance in the pocket at a position in a minor axis direction is equal to or larger than a radial clearance of the annular space at a major axis position.

5. The ball bearing for a strain wave gearing according to claim 3, wherein the circumferential clearance is equal to or larger than the radial clearance of the outer annular space at the major axis position, the outer annular space formed between the outer bearing ring and the cage.

6. The ball bearing for a strain wave gearing according to claim 4, wherein the circumferential clearance is equal to or larger than the radial clearance of the outer annular space at the major axis position, the outer annular space formed between the outer bearing ring and the cage.

7. The ball bearing for a strain wave gearing according to claim 3, wherein, at the major axis position, the radial clearance between the cage and the inner bearing ring is equal to or larger than the radial clearance between the cage and the outer bearing ring.

8. The ball bearing for a strain wave gearing according to claim 4, wherein, at the major axis position, the radial clearance between the cage and the inner bearing ring is equal to or larger than the radial clearance between the cage and the outer bearing ring.

9. The ball bearing for a strain wave gearing according to claim 5, wherein, at the major axis position, the radial clearance between the cage and the inner bearing ring is equal to or larger than the radial clearance between the cage and the outer bearing ring.

10. The ball bearing for a strain wave gearing according to claim 6, wherein, at the major axis position, the radial clearance between the cage and the inner bearing ring is equal to or larger than the radial clearance between the cage and the outer bearing ring.

* * * * *